INVENTOR.
REVILO FULLER. AND
BY JAMES ORIEN LAIR.
ATTORNEY

Feb. 26, 1957

R. FULLER ET AL 2,782,535

DITCHING MACHINE

Filed Sept. 28, 1953

INVENTOR.
REVILO FULLER. AND
BY JAMES ORIEN LAIR.

Willard S. Ground
ATTORNEY.

INVENTOR.
REVILO FULLER. AND
BY JAMES ORIEN LAIR.
ATTORNEY.

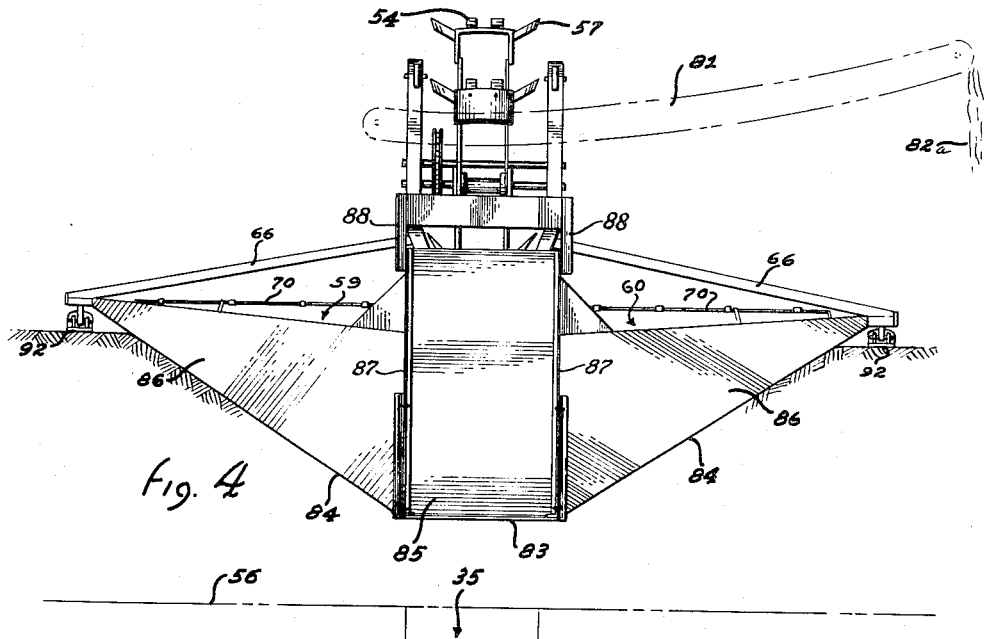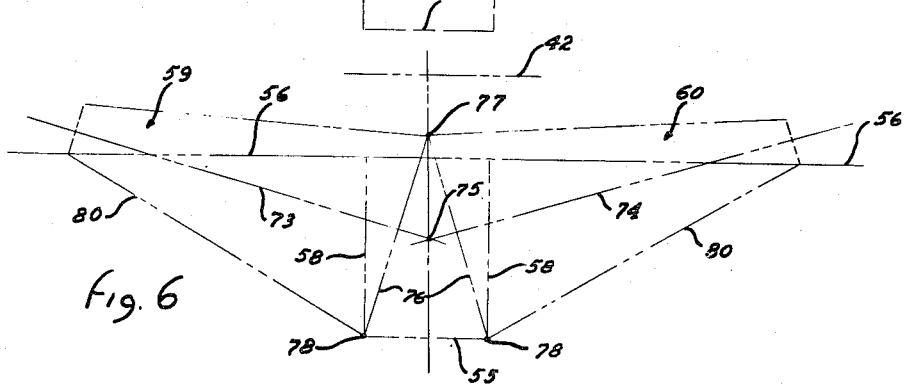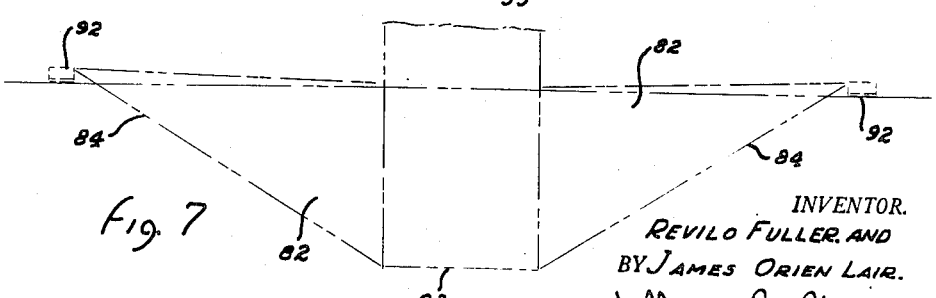

United States Patent Office 2,782,535
Patented Feb. 26, 1957

2,782,535
DITCHING MACHINE

Revilo Fuller, Phoenix, and James Orien Lair, Tolleson, Ariz., assignors to Fullerform, Inc., Phoenix, Ariz., a corporation of Arizona Application September 28, 1953, Serial No. 382,694

14 Claims. (Cl. 37—97)

This invention pertains to improvements in ditching machines and is particularly directed to a self propelled power driven machine for cutting a ditch in a ground surface to a predetermined depth, profile, and cross section with a high degree of efficiency and accuracy.

One of the problems in the preparation of an irrigation or drainage ditch or the like is to provide an accurately preformed cut in a berm or ground surface having the desired fall and profile and an accurately aligned cross section so as to facilitate the flow of liquid through the ditch. Further, the preparation of such a preformed ditch surface of high accuracy is essential where it is desired to place a lining in such a ditch, as it facilitates the proper and accurate movement of subsequent lining apparatus in the preformed ditch so as to provide a uniform and smooth and hydraulically efficient finished lined ditch.

One of the objects of this invention is to provide an improved trenching machine which is self propelled and capable of cutting a preformed trough, ditch or the like, in a ground surface with a high degree of accuracy and with a minimum of time being required to do the job.

Still another object of this invention is to provide an improved trenching machine utilizing a combination of a cylindrical rotary cutter wheel and a pair of transversely disposed conical side cutters all operating simultaneously and feeding along to cut a preformed ditch in a ground surface.

Still another object of this invention is to provide an improved trenching machine including a rotary hollow cylindrical digger wheel and a pair of transversely located conical side cutter wheels driven at a more rapid rate than said cylindrical wheel so as to completely cut a V-shaped ditch or the like.

Still another object of this invention is to provide an improved trenching machine in which there is provided a central cylindrical digger wheel and a pair of conical side cutter wheels having their axes sloping upwardly away from said central cylindrical wheel and in which the base of the conical cutters are adjacent each other and extend within the rotary confines of the cylindrical digger wheel.

It is still another object of this invention to provide a trenching machine with a rotary hollow cylindrical digger wheel and a pair of transversely disposed conical digger wheels driven from said cylindrical wheel at a more rapid rate and in which the outer ends of said conical digger wheels are supported on ground contacting shoes sliding along the berm of the ditch being cut.

It is still further an object of this invention to provide a ditching machine with a rotary hollow cylindrical digger wheel and a pair of transversely disposed conical digger wheels driven simultaneously with said cylindrical wheel at a more rapid rate and to provide directly behind all of said digger wheels a final scraper for precisely completing the finished surface of the ditch and which scraper has a ground contacting shoe riding in the bottom of the preformed ditch.

Further features and advantages of this invention will appear from a detailed description of the drawings in which:

Fig. 2a is an enlarged fragmentary view of a detail shown in Fig. 2 particularly showing the gear drive transmission to the conical digger wheels.

Fig. 4 is a rear elevation of the apparatus shown in Figs. 1 and 2.

Fig. 5 is a diagrammatic transverse sectional view on the line 5—5 of Fig. 1.

Fig. 6 is a diagrammatic transverse view on the line 6—6 of Fig. 1.

Fig. 7 is a diagrammatic transverse view on the line 7—7 of Fig. 1.

Figure 1:
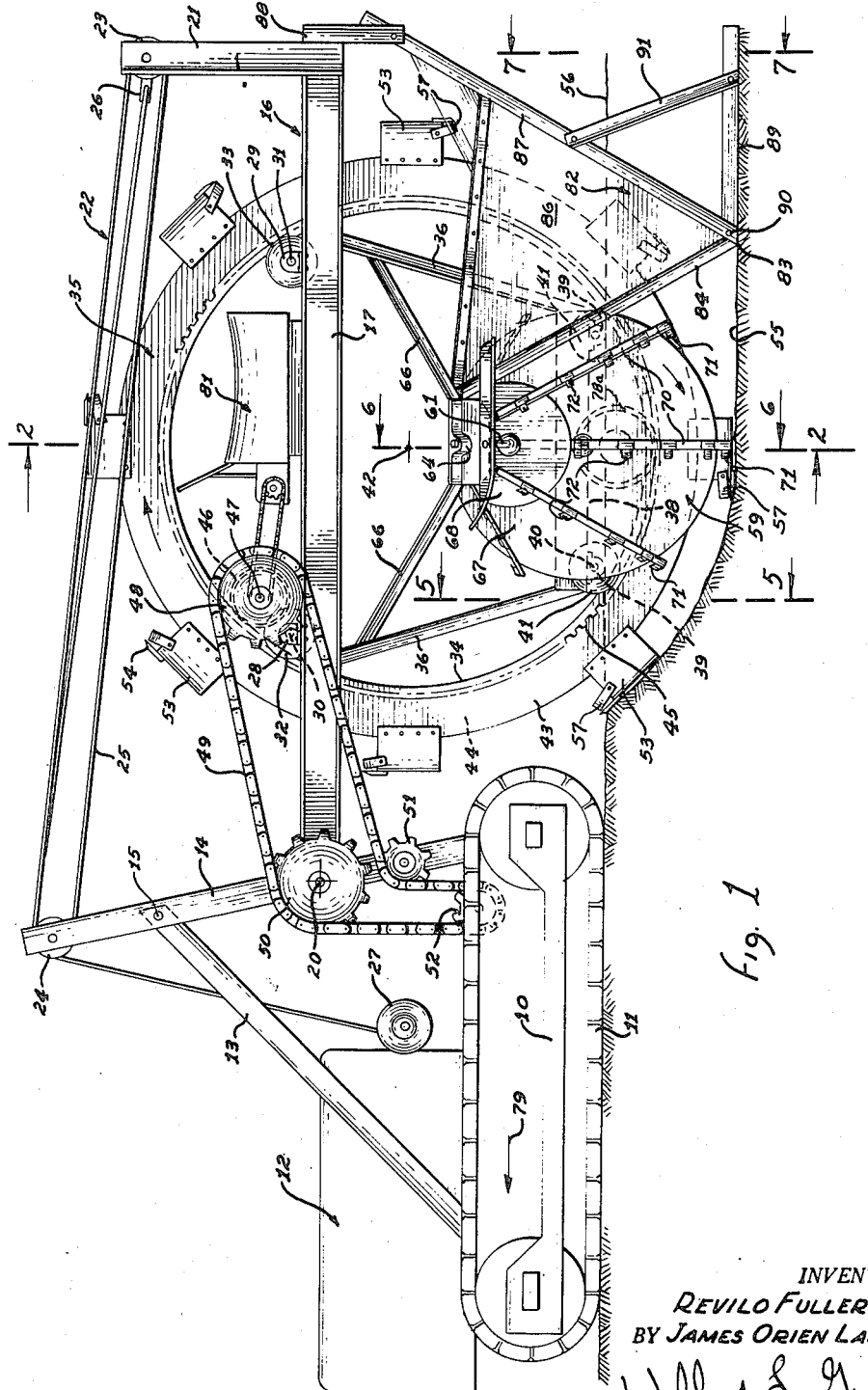
Fig. 1 is a left hand side elevation of a ditching machine incorporating the features of this invention.

As illustrative of one embodiment of this invention there is shown a ditching machine comprising the chassis 10 which is mounted upon suitable endless tractor treads 11. Appropriately fixed to the chassis 10 is the main drive engine and transmission 12 and the frame work comprising the members 13 and 14 which are rigidly connected at 15.

A boom indicated generally at 16 comprises the I-beams 17 and 18 which are rigidly connected together at their ends by a cross piece 19, is pivotally mounted to rock about an axis 20 on the frame work member 14 so that the outer end may be swung upwardly and downwardly about this axis of pivoting 20. Fixed to the outer ends of the I-beams 17 and 18 are the upright members 21 to which is connected the block and tackle arrangement indicated generally at 22 comprising the pulleys 23 pivotally mounted in the upper ends of the upright members 21, the pulleys 24 in the top portion of the frame work member 14 and the cable 25 which is dead head connected at 26 to the members 21 and has its outer free end connected to be wound up or unwrapped from a suitable winch 27 driven in a conventional manner (not shown) from the main drive engine 12. In this manner, by appropriately rotating the winch 27, the cable 25 will raise or lower the boom 17—18 about its pivotal connection 20 to any desired height to control the depth and profile of the ditch being cut.

Journaled on suitable bearing supports 28 and 29 are the roller shafts 30 and 31 respectively and intermediate the bearings 28 and 29 on the shafts 30 and 31 are fixed the rollers 32 and 33 respectively, which contact the bearing surfaces 34 of the central cylindrical digger wheel indicated generally at 35. Depending from the boom I-beams 17 and 18 are the downwardly extending frame members 36 which are rigidly fixed at their lower ends to the triangular support member 37 extending longitudinally between the lower ends of the frame members 36. On the lower surface 38 of the triangular support member 37 are fixed suitable bearing supports 39 carrying the lower roller shafts 40 upon which are fixed suitable rollers 41 similar to the rollers 32 and 33, which likewise engage the bearing surfaces 34 of the central cylindrical digger wheel 35. By this arrangement of the rollers 32, 33, and 41 the central cylindrical digger wheel revolves freely around an axis of rotation 42.

On each of the side ring members 43 and 44 having the bearing surfaces 34 of the central cylindrical digger wheel, there are formed the main driving gear teeth 45 which are engaged by the main drive pinion 46 carried on the gear box shaft 47. The shaft 47, in turn is connected to a sprocket 48 over which operates a drive chain 49 passing over the idler sprockets 50 and 51 suitably journaled on the frame work member 14 and finally passing over the output drive sprocket 52 of the tractor main drive engine and transmission 12 (not shown in detail).

Fixed on the side ring members 43 and 44 are the digger buckets 53 which have bottom cutting teeth 54 adapted to cut the bottom surface 55 of the trench to be formed in the berm 56 and side cutting teeth 57 which cut the side portions 58 of the ditch.

Figure 2:
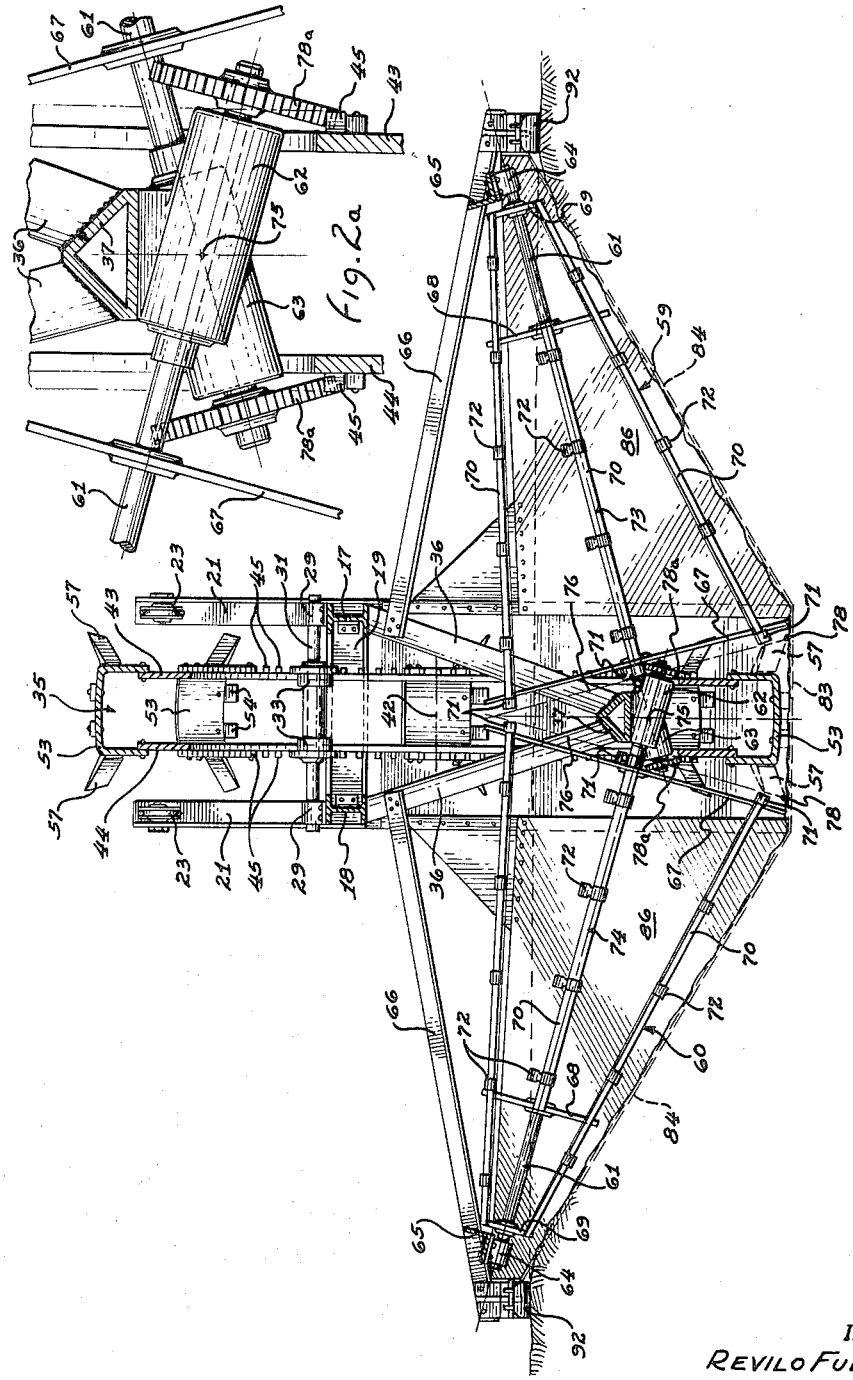
Fig. 2 is a transverse section on the line 2—2 of Fig. 1.
Figure 3:
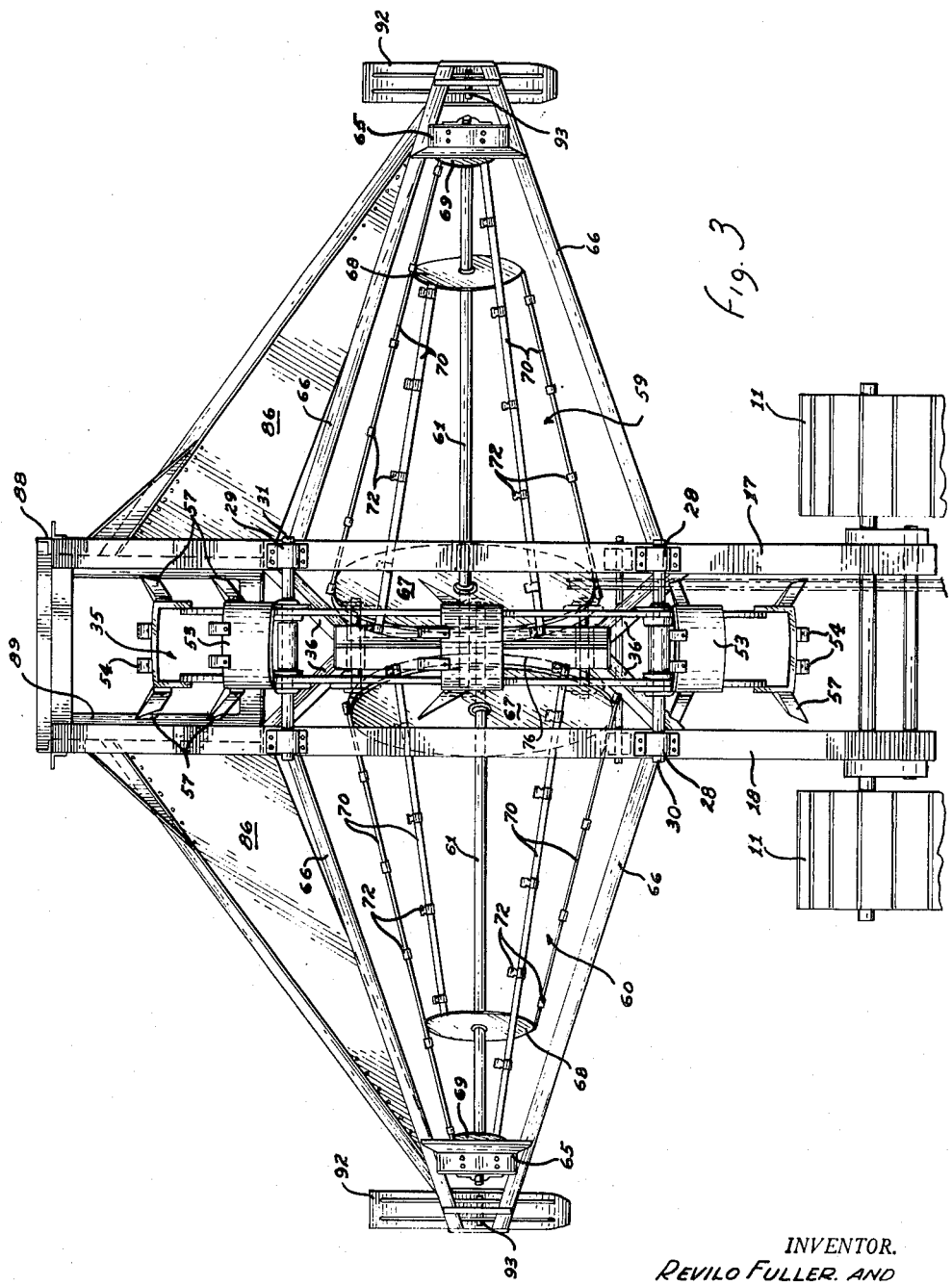
Fig. 3 is a plan view of the apparatus shown in Fig. 1.

Associated with the central cylindrical digger wheel are the transversely disposed conical digger wheels indicated generally at 59 and 60. Each of these conical digger wheels comprises a central drive shaft 61 which is journaled at the lower end in the bearing supports 62 and 63 fixed to the lower surface 38 of the triangular support member 37. The other end of the shafts 61 are supported in bearing members 64 which are carried on support plates 65 carried on the outer ends of the struts 66 rigidly connected to the downwardly extending frame members 36. Fixed on the shafts 61 are the supporting discs 67, 68 and 69 to the outer periphery of which are fixed the digger tooth support members 70 upon which are mounted the digger teeth 71 and 72. It is important to note that the axes of rotation 73 and 74 of the respective conical digger wheels 59 and 60 are angularly disposed relative to one another and to the axis of rotation 42 of the central cylindrical digger wheel 35. These axes intersect at a point 75, Figs. 2 and 6, while they are offset from one another in a horizontal direction as best seen in Fig. 3. It is also to be noted that the base 76 of the conical digger wheels as defined by the path of travel of the digger teeth 71 on the conical digger members 59 and 60 substantially contact each other at the point 77 which point 77 lies inside of the cylindrical digger wheel 35. It is to be further noted that the base lines 76 of the conical digger wheels substantially intersect the ditch bottom line 55 and the ditch sides 58 cut by the central cylindrical digger wheel 35 at the points 78 as best seen in Fig. 6.

On the lower ends of the shafts 61 of the conical digger wheels 59 and 60 are fixed the drive pinions 78a which engage the main drive gear teeth 45 of the central cylindrical digger wheel 35 so that the shaft 61 and the conical digger wheels are driven from the central cylindrical digger wheel and thus from the drive mechanism of the tractor. In this particular arrangement the drive comes directly to the conical digger wheels from the central cylindrical digger wheel, although it is to be understood that any suitable drive transmission connected to the transversely disposed conical digger wheels may be utilized. It is important to note further that the conical digger wheels are revolved in the same direction but at a more rapid rate than the central cylindrical digger wheel 35 due to the gear ratio speed-up between the gears 45 and the pinion 78a. In other words, the conical digger wheels 59 and 60 rotate at a more rapid revolution per minute than the central digger wheel 35.

Thus, in this arrangement it will be noted that the central cylindrical digger wheel 35 removes the trench or slotted portion from the berm 56 bounded by the lines 58—55—58 shown in Fig. 5 as the tractor feeds forward in the direction indicated by the arrow 79, Fig. 1. Immediately following and operating simultaneously therewith, the conical digger wheels 59 and 60 cut out the sides 80 of the ditch and remove the material bounded by the lines 56—58—80, Fig. 6. Because of the angular positioning of the axes 73 and 74, the slope 80 of the sides of the ditch, and the direction of travel of the digger teeth of the conical digger wheels being parallel to the base line 76 of these conical digger wheel members, the material from the side areas 56—58—80 is moved on down into the trench portion 55—58, Fig. 5, where it is picked up and removed by the central cylindrical digger wheel and deposited in the usual discharge conveyor indicated generally at 81 for disposal at the point 82a, Fig. 4, in the usual well known manner for such conveyors. Thus, the ditch is cut by the central cylindrical digger wheel and the conical digger wheels to the configuration 80—55—80, Fig. 6.

In order to provide a final clean cut surface free of any loose lumps or other imperfections there then is provided a final finishing and sizing scraper arrangement indicated generally at 82. This arrangement comprises the bottom scraping edge 83 and the side scraping edges 84 and scraper plate 85 associated with the bottom scraper edge 83 and the side plates 86 as best seen in Fig. 4. The plate 85 is secured by suitable supports 87 and 88 to the outer end of the boom members 17 and 18 respectively, while the upper inner end of the plates 86 are secured to the outer end of strut member 66 so that, in operation, the edges 83 and 84 and the respective plates 85 and 86 are rigidly carried on the boom structure 17—18. It is to be noted that any excess material carried along in front of the edges 83—84 is constantly being removed by the rotation of the digger wheel 35 and the conical cutter wheels while at the same time allowing the cutting edges 83 and 84 of the scraper to precisely align and finish the ditch surfaces 55—88.

In addition to the edges 83 and 84 there is provided a ground contacting shoe 89 rigidly connected at 90 to the plate member support 87 and connected by a strut 91 with the member 87 for greater rigidity. This ground contacting shoe 89 slides along on the bottom 55 of the preformed ditch to give added stability and better compaction of the material in the bottom portion of the ditch as required.

It may also be desirable, in the interest of greater stability under certain unfavorable soil or operating conditions to provide a pair of berm contacting shoes 92 each of which is pivotally mounted on a suitable pivot pin 93 carried on the outer ends of the struts 66. These shoes skid along on the finished berm surface 56 to provide lateral or transverse stability for the digger unit in those cases where the berm has been accurately predetermined and positioned. It is to be understood, however, that the apparatus is not necessarily confined to its use of the berm contacting shoes 92 but will function perfectly satisfactory under ordinary conditions without such apparatus being necessary, particularly in instances where the berm surface 56 is sufficiently compacted to properly support the load of the endless tractor treads 11 as the unit feeds forward in the direction indicated by the arrow 79 in Fig. 1.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. In a ditching machine, a cylindrical digger wheel rotatable on a transverse horizontal axis, a transversely disposed conical digger wheel on each side of said cylindrical digger wheel each rotatable on an axis angularly related to each other and to said axis of said cylindrical digger wheel, digging teeth on said cylindrical digger wheel traveling in a path to cut a vertical sided trench, digging teeth on said conical digger wheels traveling in conically arranged circular paths for cutting sloping sides of the ditch, certain of said digging teeth on each of said conical digger wheels traveling in a path which is angularly related to the path traveled by the digging teeth on said cylindrical digging wheel and having a portion which lies within the projection of the width of said last mentioned digging teeth path, means for simultaneously rotating said cylindrical digger wheel and said conical digger wheels including means for rotating said conical digger wheels in the same direction and at a faster revolution per minute than said cylindrical digger wheel, means for bodily moving said digger wheels while simultaneously rotating at feeding movement along a berm to cut a ditch therein, scraper blade means located behind said digger wheel to finally size the ditch cut by said digger wheels, said scraper blades to be positioned relative to said wheels so that material scraped up in front of said scraper blade means is downwardly and forwardly engaged by and discharged from the ditch by said digger wheel teeth, and a ground contacting shoe engaging the bottom of the finished ditch carried on and fixed to said scraper blade means, and berm contacting shoes located at the outer ends of said conical digger wheels and carried on said scraper blade means.

2. A ditching machine including, a hollow cylindrical digger wheel revolving about a horizontal transverse axis, a conical digger wheel having a base and an apex revolving about an upwardly and outwardly sloping angularly related transverse axis on each side of said digger wheel with the base of said conical digger wheels lying substantially within the width of said cylindrical digger wheel, and means for simultaneously rotating said digger wheels.

3. A trenching machine having, a frame, a cylindrical ring-shaped digger wheel revolving about a transverse horizontal axis on said frame, a conical digger wheel journaled on said frame extending from each side of said cylindrical digger wheel and revolving on a transverse axis angularly related to each other and to the axis of said cylindrical digger wheel, the angularly related bases of said conical digger wheels being located adjacent each other at their top edges and substantially within the sidewise confines of said cylindrical digger wheel, and means for simultaneously revolving all of said digger wheels in the same direction.

4. A trenching machine having, a frame, a cylindrical ring-shaped digger wheel revolving about a transverse horizontal axis on said frame, a conical digger wheel journaled on said frame extending from each side of said cylindrical digger wheel and revolving on a transverse axis angularly related to each other and to the axis of said cylindrical digger wheel relative to a vertical plane passing through said axis of said cylindrical digger wheel, said axes of said conical digger wheels sloping upwardly and outwardly from said cylindrical digger wheel with the apex of said conical digger wheels at the outer ends of said axes so that the angularly related bases of said conical digger wheels are located substantially within the width of said cylindrical digger wheel, and means for simultaneously revolving all of said digger wheels.

5. A trenching machine having a cylindrical digger wheel rotatable about a transverse horizontal axis, digger teeth on said cylindrical digger wheel traveling in a circular path to cut a flat bottomed vertical sided trench, conical digger wheels extending transversely from each side of said cylindrical digger wheel rotatable on angularly related axes lying substantially in a vertical plane passing through said transverse horizontal axis of rotation of said cylindrical digger wheel and sloping upwardly and outwardly from said cylindrical digger wheel, digger teeth on said conical digger wheels arranged to travel in circular paths of decreasing radius toward the outer ends of said conical digger wheels to cut the sloping sides of said ditch, some of said digger teeth traveling in a circular path defining a base for said conical digger wheels lying substantially within said vertical sides of the trench cut by said cylindrical digger wheel, and means for simultaneously rotating all of said digger wheels.

6. A trenching machine having a cylindrical digger wheel rotatable about a transverse horizontal axis, digger teeth on said cylindrical digger wheel traveling in a circular path to cut a flat bottomed vertical sided trench, conical digger wheels extending transversely from each side of said cylindrical digger wheel rotatable on angularly related axes lying substantially in a vertical plane passing through said transverse horizontal axis of rotation of said cylindrical digger wheel and sloping upwardly and outwardly from said cylindrical digger wheel, digger teeth on said conical digger wheels arranged to travel in circular paths of decreasing radius toward the outer ends of said conical digger wheels to cut the sloping sides of said ditch, some of said digger teeth traveling in a circular path defining a base for said conical digger wheels substantially within the width of said cylindrical digger wheel lying in planes perpendicular to said axes of rotation of said conical digger wheels and passing through the lines of intersection of said sides and bottom of the trench cut by all of said digger wheels, and means for rotating said digger wheels at predetermined rates of speed.

7. In a trenching machine, a tractor, power means for driving said tractor at a feed rate, a frame fixed on said tractor, a boom movably mounted on said frame, means actuable by said power means for raising or lowering said boom, a cylindrical digger wheel rotatably mounted on said boom to revolve about a transverse horizontal axis, transversely disposed conical digger wheels, shafts supporting said conical digger wheels journaled on said boom on upwardly and outwardly sloping axes of rotation from said cylindrical digger wheel lying substantially in a vertical transverse plane passing through the axis of rotation of said cylindrical digger wheel, digger buckets fixed on the periphery of said cylindrical digger wheel, a transverse conveyor to receive discharge from said buckets, bottom digger teeth fixed on said buckets, side digger teeth fixed on said buckets, digger teeth on the periphery of said conical digger wheels some of which travel in paths defining the bases of said conical digger wheels, said paths lying for the most part within the width of the path of travel of said side digger teeth on said cylindrical digger wheel, and means for rotating said digger wheels from said power means.

8. In a trenching machine, a tractor, power means for driving said tractor at a feed rate, a frame fixed on said tractor, a boom movably mounted on said frame, means actuable by said power means for raising or lowering said boom, a cylindrical digger wheel rotatably mounted on said boom to revolve about a transverse horizontal axis, transversely disposed conical digger wheels, shafts supporting said conical digger wheels journaled on said boom on upwardly and outwardly sloping axes of rotation from said cylindrical digger wheel lying substantially in a vertical transverse plane passing through the axis of rotation of said cylindrical digger wheel, digger buckets fixed on the periphery of said cylindrical digger wheel, a transverse conveyor to receive discharge from said buckets, bottom digger teeth fixed on said buckets, side digger teeth fixed on said buckets, digger teeth on the periphery of said conical digger wheels some of which travel in paths defining the bases of said conical digger wheels, said paths lying for the most part within the width of the path of travel of said side digger teeth on said cylindrical digger wheel, means for rotating said digger wheels from said power means comprising main driving gear teeth formed on each side of said cylindrical digger wheel, main drive pinions engaging said main driving gear teeth, means for connecting said main drive pinions to said power means, and drive pinions fixed on said conical digger wheel shafts engaging said main driving gear teeth of said cylindrical digger wheel.

9. In a trenching machine, a tractor, power means for driving said tractor at a feed rate, a frame fixed on said tractor, a boom movably mounted on said frame, means actuable by said power means for raising or lowering said boom, a cylindrical digger wheel rotatably mounted on said boom to revolve about a transverse horizontal axis, transversely disposed conical digger wheels, shafts supporting said conical digger wheels journaled on said boom on upwardly and outwardly sloping axes of rotation from said cylindrical digger wheel lying substantially in a vertical transverse plane passing through the axis of rotation of said cylindrical digger wheel, digger buckets fixed on the periphery of said cylindrical digger wheel, a transverse conveyor to receive discharge from said buckets, bottom digger teeth fixed on said buckets, side digger teeth fixed on said buckets, digger teeth on the periphery of said conical digger wheels some of which travel in paths defining the bases of said conical digger wheels, said paths lying for the most part within the width of the path of travel of said side digger teeth on said cylindrical digger wheel, means for rotating said digger wheels from said power means, and bottom and side scraper blades fixed on said boom directly behind said digger wheels so that said digger wheels may receive the material scraped up by said scraper blades.

10. In a trenching machine, a tractor, power means for driving said tractor at a feed rate, a frame fixed on said tractor, a boom movably mounted on said frame, means actuable by said power means for raising or lowering said boom, a cylindrical digger wheel rotatably mounted on said boom to revolve about a transverse horizontal axis, transversely disposed conical digger wheels, shafts supporting said conical digger wheels journaled on said boom on upwardly and outwardly sloping axes of rotation from said cylindrical digger wheel lying substantially in a vertical transverse plane passing through the axis of rotation of said cylindrical digger wheel, digger buckets fixed on the periphery of said cylindrical digger wheel, a transverse conveyor to receive discharge from said buckets, bottom digger teeth fixed on said buckets, side digger teeth fixed on said buckets, digger teeth on the periphery of said conical digger wheels some of which travel in paths defining the bases of said conical digger wheels, said paths lying for the most part within the width of the path of travel of said side digger teeth on said cylindrical digger wheel, means for rotating said digger wheels from said power means, and berm contacting shoes pivotally mounted for rocking about a transverse horizontal axis on said boom at the outer ends of said conical digger wheels.

11. In a trenching machine, a tractor, power means for driving said tractor at a feed rate, a frame fixed on said tractor, a boom movably mounted on said frame, means actuable by said power means for raising or lowering said boom, a cylindrical digger wheel rotatably mounted on said boom to revolve about a transverse horizontal axis, transversely disposed conical digger wheels, shafts supporting said conical digger wheels journaled on said boom on upwardly and outwardly sloping axes of rotation from said cylindrical digger wheel lying substantially in a vertical transverse plane passing through the axis of rotation of said cylindrical digger wheel, digger buckets fixed on the periphery of said cylindrical digger wheel, a transverse conveyor to receive discharge from said buckets, bottom digger teeth fixed on said buckets, side digger teeth fixed on said buckets, digger teeth on the periphery of said conical digger wheels some of which travel in paths defining the bases of said conical digger wheels, said paths lying for the most part within the width of the path of travel of said side digger teeth on said cylindrical digger wheel, means for rotating said digger wheels from said power means, and a ground contacting shoe fixed on said boom slidingly engaging the bottom of the ditch formed by said ditching machine.

12. A ditching machine characterized by a cylindrical digger wheel revolving about a horizontal transverse axis to cut a vertical sided flat bottomed ditch, a conical digger wheel having a base and extending transversely from either side of said cylindrical digger wheel each revolving about an axis sloping upwardly and outwardly from said digger wheel, said axes lying substantially in and parallel to a vertical plane passing through the horizontal transverse axis of said cylindrical wheel, the bases of said conical digger wheels lying substantially within the transverse width of said cylindrical digger wheel.

13. A ditching machine characterized by a cylindrical digger wheel revolving about a horizontal transverse axis to cut a vertical sided flat bottomed ditch, a conical digger wheel having a base and extending transversely from each side of said cylindrical digger wheel and revolving about an axis sloping upwardly and outwardly from said digger wheel, said axes lying substantially in and parallel to a vertical plane passing through the horizontal transverse axis of said cylindrical wheel, the bases of said conical digger wheels lying substantially within the transverse width of said cylindrical digger wheel, said bases being located with their bottom portions at the intersection of the sides and bottom of the ditch and with their upper portions intersecting at a point above said bottom and intermediate the transverse width of said cylindrical digger wheel.

14. A ditching machine characterized by a cylindrical digger wheel revolving about a horizontal transverse axis to cut a vertical sided flat bottomed ditch, a conical digger wheel having a base and extending transversely from each side of said cylindrical digger wheel and revolving about an axis sloping upwardly and outwardly from said digger wheel, said axes lying substantially in and parallel to a vertical plane passing through the horizontal transverse axis of said cylindrical wheel, the bases of said conical digger wheels lying substantially within the transverse width of said cylindrical digger wheel, said bases being located with their bottom portions at the intersection of the sides and bottom of the ditch and with their upper portions intersecting at a point above said bottom and intermediate the transverse width of said cylindrical digger wheel, said axes of said conical digger wheels intersecting at a point midway between the bottom of said ditch and the point of intersection of the upper portions of the bases of said conical digger wheels and intermediate the transverse width of said cylindrical digger wheel.

References Cited in the file of this patent

UNITED STATES PATENTS

| | | |
|---|---|---|
| 121,846 | Bussell | Dec. 12, 1871 |
| 264,062 | Bonnell | Sept. 12, 1882 |
| 828,831 | Van Buren | Aug. 14, 1906 |
| 917,821 | White | Apr. 13, 1909 |
| 953,226 | Pontius | Mar. 29, 1910 |
| 1,287,781 | Steenrod | Dec. 17, 1918 |
| 1,299,826 | Dewey | Apr. 8, 1919 |
| 1,347,860 | Krupp | July 27, 1920 |
| 1,462,488 | George | July 24, 1923 |
| 2,237,773 | Van Voorhis et al. | Apr. 8, 1941 |
| 2,627,681 | Diotti | Feb. 10, 1953 |